United States Patent Office 3,010,322
Patented Nov. 28, 1961

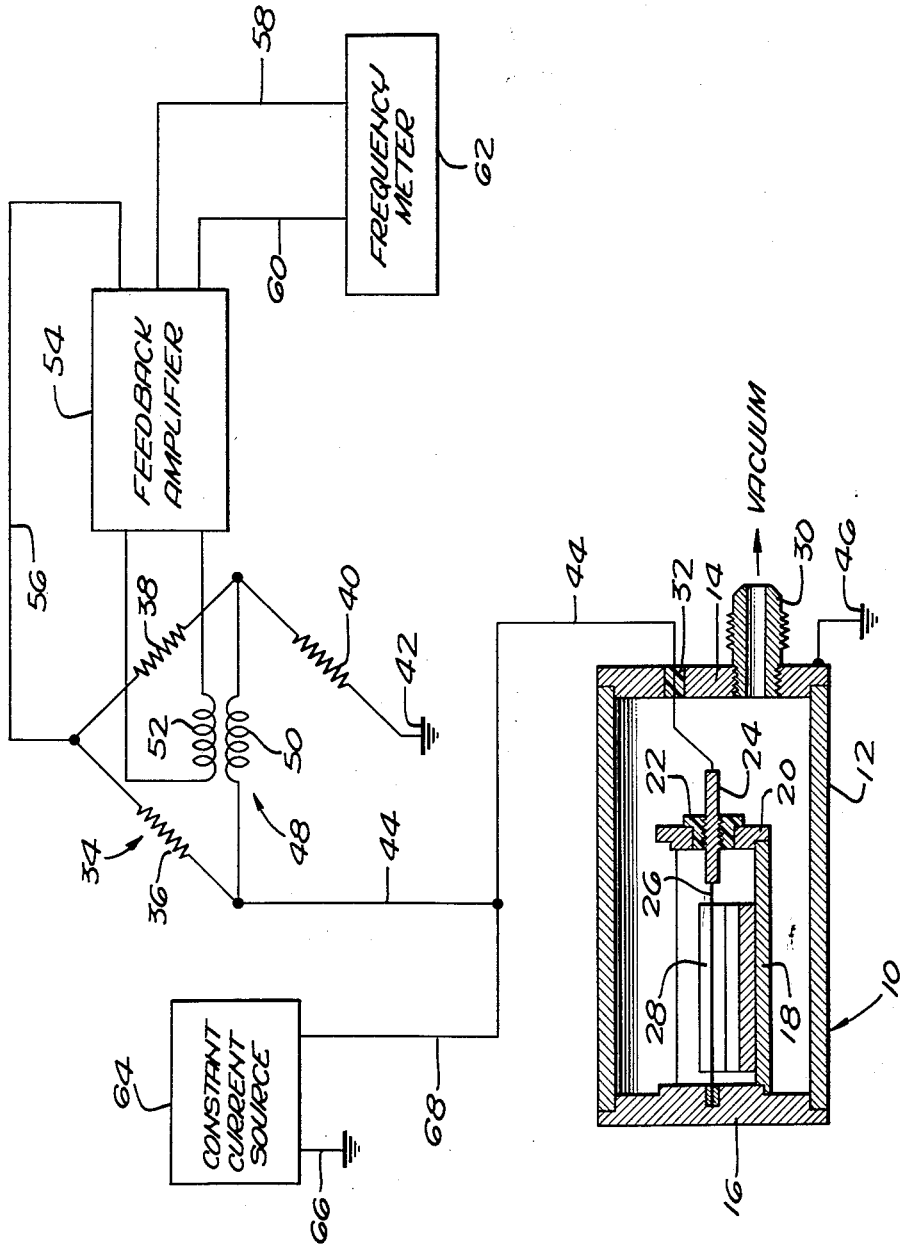

3,010,322
PRESSURE RESPONSIVE DEVICES AND
SYSTEMS THEREFOR
Paul J. Holmes, Laguna Beach, Calif., assignor to Borg-Warner Corporation, Chicago, Ill., a corporation of Illinois
Filed Jan. 22, 1959, Ser. No. 788,365
6 Claims. (Cl. 73—399)

This invention relates to devices and systems for measuring pressures and variations thereof, and more particularly to such devices and systems for measuring subatmospheric pressures.

Heretofore, gauges for the measurement of pressures substantially less than one atmosphere have not proved satisfactory, principally because of the inherent insensitivity and hence inaccuracy of the diaphragm-type mechanisms employed in such gauges. For instance, prior devices have not been capable of sensing extremely small changes in pressure in the region approaching complete evacuation.

In view of this, it is an object of this invention to provide a pressure gauge which is very sensitive to small changes in pressure.

It is also an object of this invention to provide a pressure gauge which is extremely sensitive to small changes in subatmospheric pressure.

Another object is to provide a device as characterized above, having variable stress means which is subject to a change in temperature in response to variations in pressure being sensed.

Another object is to provide a system including a device as characterized above, comprising means for measuring variations in the stress of said variable stress means as an indication of variations in pressure.

Another object is to provide a device as characterized above, wherein the variable stress means is in circuit with a source of substantially constant electrical current such that a change in pressure to be measured varies the heat conductivity of the medium surrounding said stress means for corresponding variation in the stress thereof due to change in temperature by virtue of electrical current flow therethrough.

Another object of this invention is to provide a device as described above, wherein the variable stress means is a string which is caused to vibrate within a magnetic field of constant strength, said string constituting one leg of an electrical resistance bridge which is associated with a positive feedback amplifier whereby said string acts as a tuned electrical element to cause said amplifier to have an output frequency which corresponds to the stress of said string.

The novel features which I consider characteristic of my invention are set forth with particularity in the appended claims. The device itself, however, both as to its organization and mode of operation, together with additional objects and advantages thereof, will best be understood from the following description of a specific embodiment when read in connection with the accompanying drawing in which:

The single figure is a schematic drawing showing a pressure gauge system comprising one embodiment of the novel pressure gauge, the latter being shown in section.

Referring to the single figure of the drawing, numeral 10 designates the novel pressure or vacuum gauge comprising a cylindrically shaped metallic body or housing 12 having end walls 14 and 16. Fixed to end wall 16 within housing 12 is stress responsive means comprising a metallic support member 18 which may be partially cylindrical in shape and a disc-like support member 20 fixed to one end of member 18. Member 20 is formed with an opening wherein is positioned an electrical insulating bushing 22 having a through opening provided with fastening means for receiving and retaining a metallic mounting pin 24.

A nonmagnetic electrically conductive vibratory element or string 26 is disposed within the semi-cylindrical support member 18 and has one of its ends fixed to pin 24 while its other end is fixed to end wall 16 by means of soldering, or the like, to initially place said string in a state of tension. Positioned within the support member 18 and affixed thereto by any well known means such as welding, brazing or soldering is a substantially U-shaped permanent magnet 28 having opposed pole faces disposed on opposite sides of vibratory string 26.

End wall 14 of housing 12 is provided with a suitably formed opening for threadably receiving connection means 30 by which gauge 10 may be connected to a source of pressure variations, as for instance, a vacuum source. Also formed in end wall 14 is an opening wherein is positioned an electrical insulating hermetic sealing member or bushing 32.

Vibratory string 26 is connected in a resistance bridge network 34 to form one leg thereof. As shown in the drawings, bridge network 34 comprises resistors 36, 38 and 40. One end of resistor 40 is grounded as at 42. String 26, by virtue of lead wire 44 which is connected to mounting pin 24 and extends through bushing 32 and by virtue of grounding of housing 12 as at 46, constitutes the fourth leg of bridge network 34.

Bridge network 34 further comprises an output transformer 48 having a primary winding 50 connected across the output terminals of network 34 and a secondary winding 52. Such secondary winding is connected to the input terminals of a feedback amplifier denoted in the drawing by block 54. A feedback circuit 56 is connected between amplifier 54 and the input of bridge network 34 at the junction of resistors 36 and 38. The output of feedback amplifier 54 is connected by means of lead wires 58 and 60 to a frequency indicating device 62 which may take the form of a frequency meter or a frequency counter as desired.

Vibratory string 26 is also connected in circuit with a constant current electrical supply source represented in the drawing by a block identified with numeral 64. In actual practice, it is not mandatory that source 64 have a direct current output but rather, it may have an alternating current output which has a frequency greatly removed from the frequency of vibration of string 26 as will hereinafter become apparent upon a complete understanding of the operation of the system shown in the drawing. Source 64 is grounded as at 66 and is connected in circuit with string 26 by virtue of lead wire 68 which is connected to lead wire 44.

The details of construction of feedback amplifier 54 separate and apart from the other components of the disclosed system do not form a basis for the present invention and may be determined by reference to Rieber Patent 2,689,943.

In operation, gauge 10 is connected to a source of pressure variations by connection means 30 and suitable tubing (not shown).

Under steady state conditions, string 26 vibrates in a direction transverse with respect to the flux flow afforded by permanent magnet 28, the frequency of such vibration corresponding to the stress or tension of said string. Since string 26 is electrically conductive, such vibration generates an electromotive force therein. Bridge network 34 is so constructed as to be balanced when the string 26 is not vibrating. Because of this an appreciable output is developed in primary winding 50 of transformer 48 whenever string 26 is vibrating at its resonant frequency. Such output in primary winding 50 develops a corresponding signal in secondary winding 52 of transformer 48, which signal is fed to feedback amplifier 54.

Thereupon, amplifier 54 effects suitable amplification of such signal and returns a portion of the output of amplifier 54 to the input of bridge network 34. Such feedback current flows through network 34 including wire 26 thereby sustaining string 26 in vibration at its resonant frequency. This latter effect is obtained by virtue of the fact that the feedback current is of a positive characteristic with respect to the aforementioned current developed in string 26 as a result of its vibration in the magnetic field. The sustaining force for the vibration of string 26 results from the interaction of the magnetic flux afforded by permanent magnet 28 and the magnetic flux afforded by the flow of positive feedback current through said string 26.

A major portion of the output of feedback amplifier 54 is fed to the frequency readout apparatus 62 for indication of the frequency of the output signal from such amplifier. In this manner, frequency meter 62 affords a continuous indication of the frequency of vibration of string 26 and hence the stress or tension thereof. Any variation in the stress of string 26 is immediately reflected as a change in the natural frequency of vibration thereof so that the output of amplifier 54 as indicated or recorded by read-out device 62 is changed accordingly.

The present invention contemplates continuously passing a constant electrical current through string 26 during its period of vibration. Such flow of constant current or high frequency alternating current, as desired, in no way interferes with the above explained operation for sustaining string 26 in vibration at its natural resonant frequency.

The flow of current through string 26 generates heat therein by virtue of the electrical resistance of string 26. Now by directly exposing string 26 to the pressure variations as by positioning such string within the chamber defined by housing 12 as shown in the drawing and explained above, as the pressure within such chamber is varied the heating effect of string 26 is correspondingly affected due to the change in density of the medium surrounding string 26. That is, as the pressure within housing 12 is decreased, the density of the medium surrounding wire 26 is decreased accordingly, such decrease in density decreasing the heat conductivity of such medium and causing such wire to retain a greater portion of the heat generated therein by the constant current flow therethrough. Such increase in heating of string 26 causes the stress or tension of string 26 to change correspondingly, whereupon the frequency as read by meter 62 is likewise changed.

It has been found that the above described heating of string 26 is considerable particularly in the pressure ranges approaching complete evacuation. This is due to the fact that within such ranges the density of the medium in the chamber defined by housing 12 is already quite low and any change in such density effects an appreciable percentage change therein and hence an appreciable change in the heat conductivity thereof.

In view of the foregoing, it is seen that the present invention provides a pressure indicating device which is applicable for various ranges of pressure variations, and particularly for the ranges of subatmospheric pressure variations approaching complete evacuation.

Although I have shown and described certain specific embodiments of my invention, I am fully aware that many modifications thereof are possible. My invention, therefore, is not to be restricted except insofar as is necessitated by the prior art and by the spirit of the appended claims.

What I claim is:
1. In a pressure gauge, the combination comprising, means affording a sealed chamber for pressure variations in a medium therewithin, prestressed variable stress means at least a portion of which is exposed to the pressure variations of said medium, means comprising a resistance bridge network having a feedback amplifier connected to said variable stress means for vibrating said variable stress means at a frequency corresponding to its stress, and means connected to said variable stress means for applying heat to said variable stress means at a substantially constant rate for variation in the stress thereof with changes in the density of said medium as caused by such pressure variations, whereby the frequency of vibration of said variable stress means is a measure of the pressure within said chamber.

2. In a pressure gauge, the combination according to claim 1, wherein the variable stress means is electrically conductive and the means for applying heat to said variable stress means is a source of constant current in circuit with said variable stress means.

3. In a pressure gauge, the combination according to claim 2, wherein said variable stress means is an electrically conductive string.

4. In a pressure gauge, the combination according to claim 1, wherein said variable stress means is a nonmagnetic electrically conductive string, and the means for vibrating said string include means affording magnetic flux flow transversely of said string and wherein said resistance bridge network includes said string as one leg thereof and said feedback amplifier in circuit electrically with said resistance bridge network whereby said string constitutes a tuned electrical element.

5. In a pressure gauge, the combination according to claim 4, wherein the resistance bridge network and the feedback amplifier constitute an oscillator the frequency of which is controlled by said tuned electrical element.

6. In a pressure gauge, the combination according to claim 5, wherein the means for applying heat to said string is a source of constant electrical current in circuit therewith.

References Cited in the file of this patent
UNITED STATES PATENTS

| | | |
|---|---|---|
| 2,712,239 | Havens | July 5, 1955 |
| 2,750,796 | Knoll et al. | June 19, 1956 |
| 2,968,943 | Statham | Jan. 24, 1961 |

OTHER REFERENCES

Instrument Practice, article entitled, "The Design and Construction of a Vibrating String Evenness Tester for Textile Yarns," by B. G. Leary, published November 1958.